(12) United States Patent
Weinbrenner

(10) Patent No.: US 8,905,116 B2
(45) Date of Patent: Dec. 9, 2014

(54) ROLLER BLIND SYSTEM

(75) Inventor: Harry Weinbrenner, Oberboihingen (DE)

(73) Assignee: BOS GmbH & Co. KG, Ostfildern (DE)

( * ) Notice: Subject to any disclaimer, the term of this patent is extended or adjusted under 35 U.S.C. 154(b) by 176 days.

(21) Appl. No.: 13/468,298

(22) Filed: May 10, 2012

(65) Prior Publication Data
US 2012/0285638 A1 Nov. 15, 2012

(30) Foreign Application Priority Data

May 13, 2011 (DE) .......................... 10 2011 075 843

(51) Int. Cl.
*B60J 1/20* (2006.01)

(52) U.S. Cl.
CPC ................ *B60J 1/2044* (2013.01); *B60J 1/208* (2013.01)
USPC ........................ 160/370.22; 160/24; 296/97.8

(58) Field of Classification Search
CPC ........ B60J 1/2044; B60J 1/208; B60J 1/2013; B60J 1/2063
USPC ............. 160/23.1, 24, 365, 370.22; 296/97.8, 296/98, 37.16, 100.15, 100.16
See application file for complete search history.

(56) References Cited

U.S. PATENT DOCUMENTS

| | | | |
|---|---|---|---|
| 5,067,546 A * | 11/1991 | Jeuffray et al. | 160/23.1 |
| 5,404,926 A * | 4/1995 | Ojima et al. | 160/280 |
| 6,086,133 A | 7/2000 | Alonso | |
| 7,316,443 B2 | 1/2008 | Schlecht | |
| 7,396,067 B2 * | 7/2008 | Thumm et al. | 296/143 |
| 8,215,697 B1 * | 7/2012 | Lin | 296/97.8 |
| 8,602,082 B2 | 12/2013 | Walter | |
| 2005/0263257 A1 * | 12/2005 | Hansen et al. | 160/370.22 |
| 2006/0290162 A1 * | 12/2006 | Schlecht | 296/97.8 |

(Continued)

FOREIGN PATENT DOCUMENTS

| | | |
|---|---|---|
| DE | 945 130 | 6/1956 |
| DE | 20 2007 018 180 U1 | 5/2008 |
| EP | 1 736 335 A2 | 12/2006 |
| EP | 2 465 716 A1 | 6/2012 |

OTHER PUBLICATIONS

Office Action of German Patent Office issued in Application No. 10 2011 075 843.7 mailed Mar. 28, 2012 (5 pages).

(Continued)

*Primary Examiner* — Katherine Mitchell
*Assistant Examiner* — Abe Massad
(74) *Attorney, Agent, or Firm* — Flynn, Thiel, Boutell & Tanis, P.C.

(57) ABSTRACT

A roller blind system for a vehicle for shading a rear window, having a fabric sheet movable between stowed and functioning conditions, with a pull-out profile provided at a distal end thereof and two guide rails located on sides of the sheet, whereby the pull-out profile incorporates two sliding pieces at its opposite ends each engaged with one guide rail. The pull-out profile covers an outlet slot for the sheet. The pull-out profile has a variable length and includes a main segment bonded to the sheet and two movable end segments movable relative to the main segment by a guide. The covering face includes a main section on the main segment and side sections on the end segments. The side sections enter into a receiving pocket enclosed by the main segment when the length of the pull-out profile is reduced.

17 Claims, 2 Drawing Sheets

(56) References Cited

U.S. PATENT DOCUMENTS

Figure 1A:
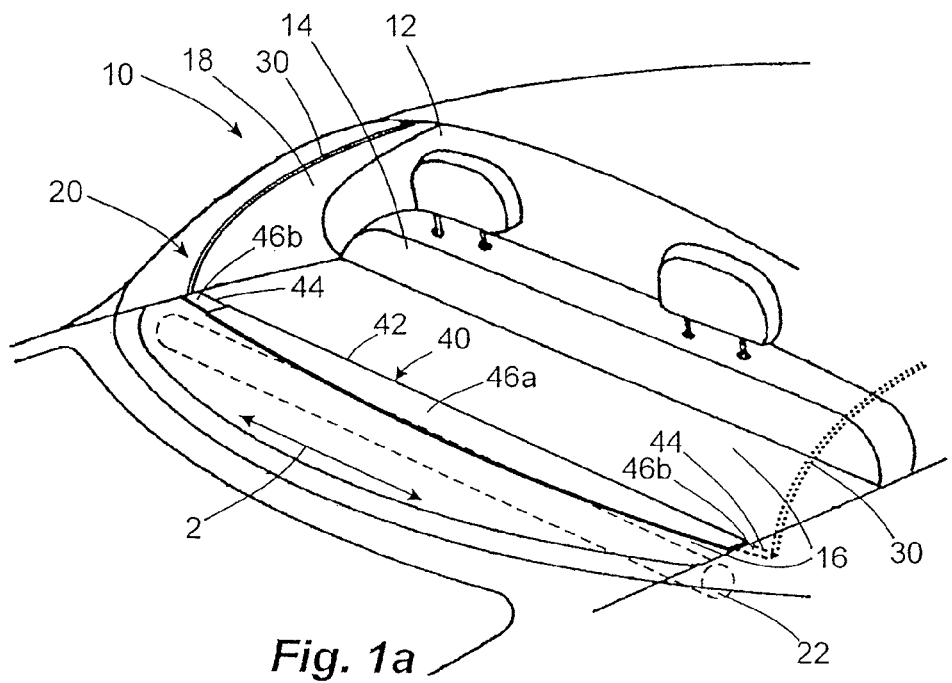

| | | |
|---|---|---|
| 2007/0144689 A1* | 6/2007 | Walter et al. ............. 160/370.22 |
| 2010/0013261 A1* | 1/2010 | Takeuchi et al. ............ 296/97.4 |
| 2012/0152472 A1* | 6/2012 | Walter ..................... 160/370.22 |
| 2012/0186756 A1* | 7/2012 | Lin ............................ 160/323.1 |
| 2012/0193935 A1* | 8/2012 | Lin .............................. 296/97.8 |

OTHER PUBLICATIONS

Search Report of European Patent Office issued in Application No. 12 16 7306 with English translation of category of cited documents dated Jun. 11, 2014 (7 pages).

\* cited by examiner

ROLLER BLIND SYSTEM

CROSS REFERENCE TO RELATED APPLICATION

This application claims the priority of German Application No. 10 2011 075 843.7, filed May 13, 2011, the disclosure of which is hereby incorporated by reference in its entirety into this application.

FIELD OF APPLICATION AND PRIOR ART

The invention concerns a roller blind system for a motor vehicle, in particular for giving shade at a rear window of the motor vehicle.

A generic roller blind system of this sort comprises a flexible fabric sheet provided particularly for the purpose of covering the window and capable of being moved between a stowed condition and a functioning condition. It includes, furthermore, at a distal end of the fabric sheet, a pull-out profile and two guide rails that are arranged on both sides of the fabric sheet when it is in its functioning condition, and which are aligned, at least partially, not parallel to one another. For the purposes of guided movement along the guide rails, the pull-out profile incorporates two sliding pieces at opposite ends, each of which engages with one of the guide rails, so that the pull-out profile can be moved along the guide rails in order to move the fabric sheet into its functioning position in a controlled manner. The pull-out profile furthermore incorporates a covering face that is directed in the pull-out direction when in the stowed condition, and which serves to cover an outlet slot for the fabric sheet.

The pull-out profile is constructed in such a manner that its length can be changed, and for this purpose incorporates a main segment bonded to the distal end of the fabric sheet and two end segments that can be moved with respect to the main section by a guide unit, orthogonally to the pull-out direction. The said covering face consists jointly of a main section on the main segment and of side sections on the end segments.

Roller blind systems of this general type are known to the prior art. They are in particular used in vehicles, particularly in the area of the rear windscreen, in order to provide shade here. Due to the fact that the rear windscreens often have an approximately trapezoidal form, the guide rails, along which the pull-out profile can be moved, are in most cases formed so that they approach one another in the pull-out direction. The distance between the sliding pieces that engage with the guide rails must therefore become less as the pull-out profile is moved along the guide rails. For this purpose the pull-out profile is constructed, as described above, of at least three partial sections. Two end segments that incorporate the sliding pieces can be moved with respect to a central main section transversely to the pull-out direction, so that the overall length of the pull-out profile can be varied in accordance with its position in the guide rails.

A generic roller blind system of this type is known, for instance, from EP 1736335 A2. The roller shaft of the roller blind system is here arranged underneath a parcel shelf, whereby this parcel shelf is interrupted by an outlet slot through which the fabric sheet is passed into the interior of the vehicle. The covering faces on the pull-out profile that face towards the interior vehicle have the purpose of covering this outlet slot when the roller blind system is stowed, for aesthetic reasons, in such a way that it can no longer be seen from the interior vehicle or from outside looking through the rear window.

In the case of the said system described in EP 17 36 335 A2, the end segments that form the side sections of the covering face have a larger cross-section than the main segment. When the pull-out profile is in its shortened condition, which normally occurs when the blind is in functioning condition, they are thus pushed onto the main segment. The desired covering effect when the roller blind system is in a stowed condition is achieved in a satisfactory manner with these end segments pushed on. There are, nevertheless, disadvantages, in particular with respect to the functioning condition. In the functioning condition, in which the pull-out profile is located in the region of the roof liner, the smaller cross-section in the region of the main segment leaves a gap open to the light, even if the roof liner is entirely flat, and this is felt to be disadvantageous. This problem is more acute when the roof liner is curved. It is indeed possible with a curved roof liner to arrange for the main section also to have a curved side edge in the main direction of its extension. Nevertheless, if the roller blind system has the known generic configuration, this curvature cannot extend all the way to the opposite ends of the main segment, since in these end regions it must exhibit an approximately constant cross-section in order for the end segments to be pushed onto it.

OBJECT AND SOLUTION

The object of the invention is to further develop a roller blind system of this generic type in such a way that it has aesthetic and functional advantages over the prior art, both when in the stowed condition and when in the functioning condition.

In accordance with the invention it is arranged for the side sections of the covering face to move into a receiving pocket enclosed by the main segment when the length of the pull-out profile is reduced.

It is thus arranged that the end segments, or at least the covering faces formed by them, are not pushed onto the main segment when the pull-out profile is shortened, but that they are pushed into it.

The covering face, which is constituted jointly of a main section on the main segment and the side sections on the end segments, thus changes its surface when the length of the pull-out profile is changed in that the visible part of the side sections is reduced, because it moves into the main segment. The main section of the covering face formed by the main segment, on the other hand, remains unchanged and entirely visible.

As a result, the multi-part construction of the pull-out profile, consisting of the main segment and the end segments, is not equally obvious in the stowed condition and in the functioning condition, since in the case of a shortened pull-out profile, which usually is found in the functioning condition, the end segments are partially, and preferably almost entirely, moved into the main segment, and can therefore scarcely be seen. In comparison with the length of the main segment, the length of the end segments is relatively short. Preferably the end segments each constitute less than 20%, and particularly less than 10%, of the total length of the pull-out profile, where this figure relates to the part of the covering face that is visible at the maximally extended length of the pull-out profile.

In the stowed condition, the pull-out profile is in a lengthened state in comparison to its minimum length extension. In this condition the end segments are at least partially withdrawn from the main section, so that the visible covering face is formed both of the main section on the main segment and of the side sections, withdrawn from the main segment, on the end segment.

The covering face here primarily has the purpose that when in this stowed condition it entirely, or almost entirely, conceals the outlet slot through which the fabric sheet emerges into the interior of the vehicle, as this slot is considered particularly aesthetically disadvantageous. Covering the outlet slot also helps to provide sound insulation between the interior of the vehicle and the vehicle's luggage space. Both in the area of its main section and in the area of its side sections, the covering face has a mean width, transverse to the main direction of its extension, of preferably at least 2 cm, particularly favourably at least 3 cm. This width ensures that the outlet slot, which usually is only a few millimeters wide, is covered reliably. The covering face does not have to cover the outlet slot directly. It can also cover a depression at the base of which the outlet slot is located. It is also considered advantageous for the cover to be matched to the slot in such a way that it cannot pass through it.

Due to the fact that for this purpose the side segments move inside the main segment, it is not possible for the side sections of the covering face to be precisely flush with the main section of the covering face. The side sections and the main section of the covering face are, however, arranged at least largely parallel to one another, whereby it is understood here that vectors that are normal to the side section on the one hand and to the main section on the other hand do not diverge from one another by more than 10°.

The fabric sheet present in a roller blind system according to the invention is preferably wound, when stowed, onto a winding shaft, from which it can be unwound by pulling on the pull-out profile. In principle, however, other configurations of the stowed fabric sheet may be considered, such as, for example, folding the fabric sheet like a concertina.

It is in principle possible for the side sections of the covering face, or even the entire end segments, to be inserted into the main segment in a receiving pocket that is open to the underneath of the pull-out profile, since the enclosure of the receiving pocket by the main segment in the sense of the invention is also given if the receiving pocket is only enclosed by the main segment at the top. It is, however, advantageous if the cross-section of the main segment in the region of the receiving pocket is closed all the way round, so that the piece of each end segment that is inserted into the main segment is fully enclosed by the main segment. In this way the multi-part construction of the pull-out profile is particularly well concealed. In a condition in which the pull-out profile has its shortest length, the end segments can be entirely, or almost entirely, concealed from view. A closed cross-section of this sort also gives the pull-out profile greater stability.

The end segments are preferably guided with respect to the main segment by sliding guides, as are already used in the design according to EP 1 736 335 A2. Guide surfaces that slide against one another are thus provided on the end segments and on the main segment, so facilitating relative linear movement between the end segments and the main segment. It is particularly advantageous here if these guides are constructed separately from the side sections of the covering face, so that the side sections of the covering face do not come into physical contact with the main segment when inserted into the receiving pocket. It is consequently advantageous if the covering face, at the ends where the side sections are, is not itself located on the guide for the side sections. Instead, a guide surface that faces in the same direction as the covering face, that is upwards in particular, is provided which restricts the movability of the covering face at the end where the side sections are in such a way that they do not come into physical contact with the main segment, as is desirable. The side sections of the covering face provided on the end segments are thus not themselves involved in guiding the end segments in relation to the main segment. It is true that this is associated with the need to provide another surface on the end segments, facing the pull-out direction, to act as a guide surface. This does, however, prevent the insertion or withdrawal of the end segments to or from the main segment leading to aesthetically unfavourable scrape marks on the side sections of the covering face. The distance between the side sections and a wall of the receiving pocket of the main segment that is to face inwards towards the side sections is preferably at least 0.3 mm, particularly at least 0.6 mm, in order to ensure reliably that even when shaken the undesirable physical contact between the side sections and the main section does not occur.

In particular it is favourable if the main segment has a form that tapers from the centre to the sides. This tapering form is provided along a longitudinal edge of the main segment which, in the case of a rear windscreen roller blind, extends in a direction essentially transverse to that of the vehicle. The form of a longitudinal edge on the opposite side is favourably largely straight. The curved longitudinal edge is able, when the fabric sheet is in its functioning condition where the pull-out profile is located approximately in the area of the roof liner, of allowing the pull-out profile to be moved up to the roof liner so that it is essentially flush, so that the entry of light into the interior of the vehicle is prevented as far as possible. In itself, a form that is curved in this way is known to the prior art. Nevertheless, due to the insertion of the end segments into the main segment according to the invention, it can extend up to the outer edges of the main segment, and thus, when the fabric sheet is in the functioning condition, can extend over almost the entire length of the pull-out profile. In particular when a main segment of this sort that tapers to the sides is used, the insertion of the end segments according to the invention is of considerable advantage.

The roller blind system preferably also comprises a covering plate in which the outlet slot, mentioned above, is provided, through which the fabric sheet is pulled as it is moved from the stowed condition into the functioning condition. This outlet slot has a length that exceeds the length of the main segment, but which nevertheless can be entirely or almost entirely covered by the pull-out profile when the end segments of the covering face are extended. Any parts of the ends of the outlet slot that might in fact not be covered, preferably have a length of less than 15 mm.

The said covering panel preferably comprises a parcel shelf located behind the rear seat of the vehicle and oriented approximately horizontally. The outlet slot may be located at the base of a depression in which the pull-out profile is positioned when the fabric sheet is stowed, so that in this stowed position an approximately flat surface is formed, consisting partly of the covering panel and partly of the covering face at the pull-out profile.

A winding shaft is preferably located underneath this covering panel, onto which the fabric sheet is wound when in the stowed condition. The fabric sheet itself here is preferably trapezoidal, in order in this way to match the non-parallel alignment of the guide rails and the shape of the rear windscreen.

The invention also concerns a vehicle with a roller blind system, in particular a roller blind system for giving shade at the rear window of the motor vehicle. The roller blind system is here constructed as described above.

SHORT DESCRIPTION OF THE DRAWINGS

Figure 1B:
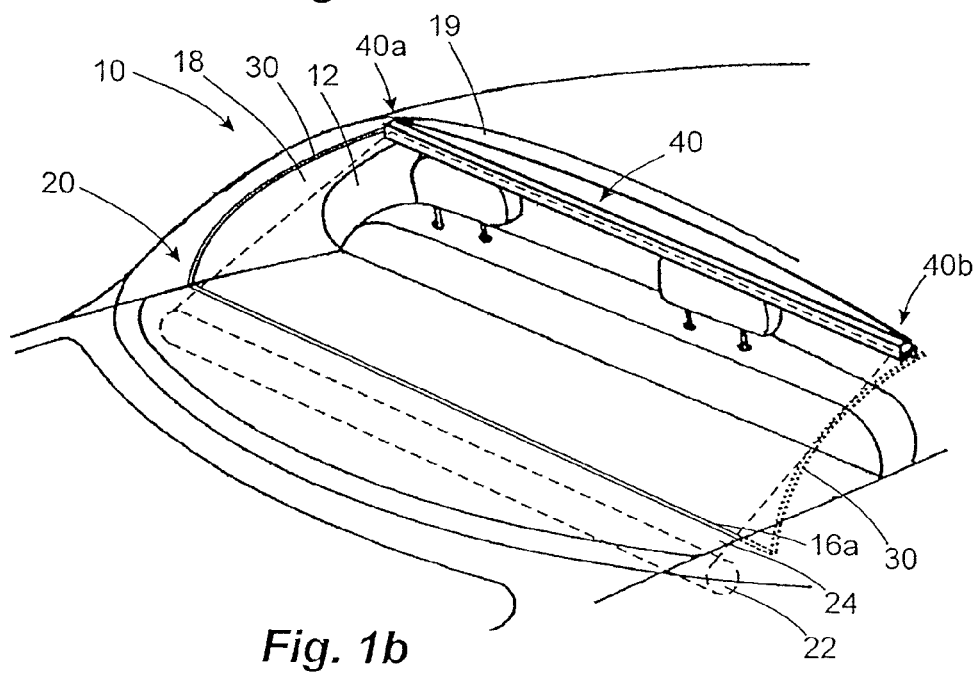
Figure 2:
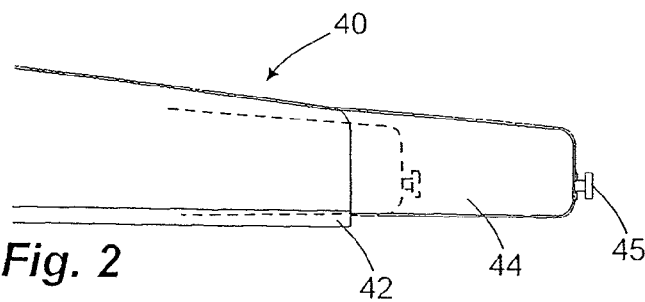
Figure 3:
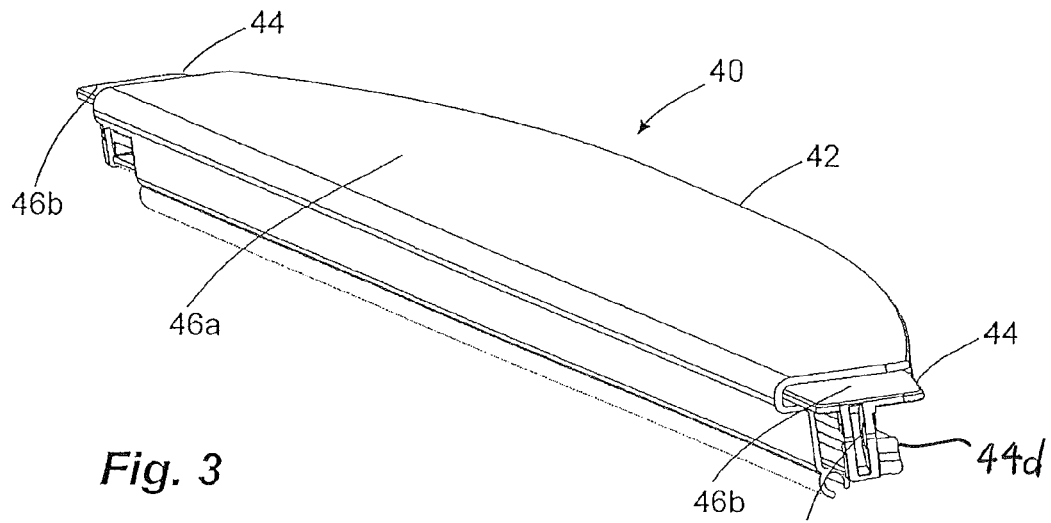
Figure 4:
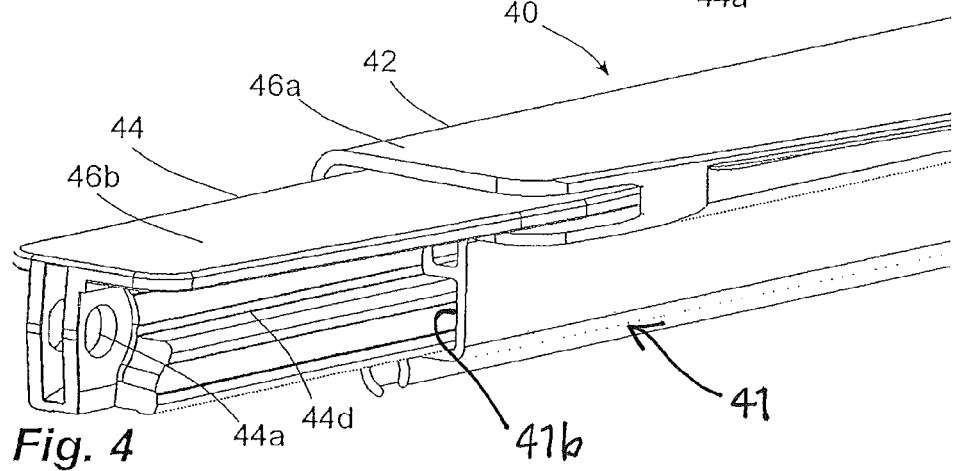
Figure 5:
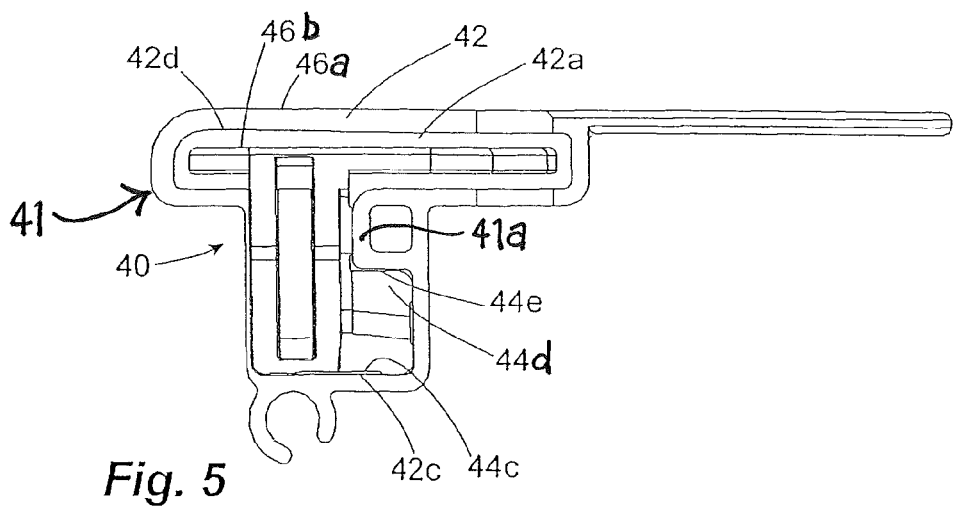

Additional aspects and advantages of the invention emerge not only from the claims but also from the description below of a preferred embodiment of the invention, which is explained in more detail with the aid of the following diagrams, in which:

FIGS. 1a and 1b show a roller blind system according to the invention in a stowed condition and in a functioning condition, FIG. 2 shows a plan view of an end region of the pull-out profile of the roller blind system of FIG. 1, FIG. 3 shows a general view of the pull-out profile of the roller blind system of FIG. 1, FIG. 4 shows a perspective view of an end region of the pull-out profile, and FIG. 5 shows a cross-section through the pull-out profile of the roller blind system.

DETAILED DESCRIPTION OF THE EMBODIMENT

FIGS. 1a and 1b illustrate the rear region of a vehicle 10, providing a view through the rear window 12 to the area of a rear vehicle seat 14 and of a parcel shelf 16 positioned behind it.

A roller blind system 20 is provided in order to provide shade at the rear window 12. This roller blind system 20 incorporates a winding shaft 22 on rotating bearings and located underneath the parcel shelf 16, onto which, when in the stowed condition of FIG. 1a, a flexible fabric sheet 24, consisting for example of textile, is wound. This fabric sheet 24 can be unwound from the winding shaft 22 through an exit slot 16a provided in the parcel shelf 16, in order to reach the functioning condition of FIG. 1b.

For the purposes of this movement into the functioning condition of FIG. 1b, a pull-out profile 40 is provided at the distal end of the trapezoidal fabric sheet 24.

This pull-out profile can be moved, guided by guide rails 30, by means of sliding pieces, not shown in more detail in FIG. 1a and 1b at its distal ends 40a, 40b. The guide rails 30 extend on both sides of the fabric sheet with respect to its functioning condition as illustrated in FIG. 1b along C-pillars 18 of the vehicle 10.

The guide rails 30 follow a curved path. In the area of their lower end they are aligned almost vertically, whereas in the area of their upper ends they are almost horizontal. In addition, the guide rails 30 converge to a small extent in the direction of their upper ends. The spacing of the guide rails 30 from one another is therefore greater at their lower end than at their upper end.

As a result of the curvature of the guide rails, the pull-out profile turns as it moves from the stowed condition of FIG. 1a into the functioning condition of FIG. 1b. The surfaces of the pull-out profile 40 that face upwards when in the stowed condition of FIG. 1a face to the front in the longitudinal direction of the vehicle when in the functioning condition.

Because the guide rails 30 are not parallel to one another, the pull-out profile 40 is, furthermore, designed to have a variable length. For this purpose, it incorporates a main segment 42 and two movable end segments 44 whose position can change with respect to the main segment 42 in the transverse direction of the vehicle 2. When the roller blind system 20 is in the stowed condition, as is illustrated in FIG. 1a, the end segments 44, which can move with respect to the main segment 42 and on which the sliding pieces are located to provide guidance against the guide rail 30, are extended. In this condition the pull-out profile therefore has its maximum extension in the transverse direction of the vehicle 2. In the functioning condition of FIG. 1b, in which the pull-out profile 40 has been moved to its final upper position along the guide rails 30, the end segments 44 are almost entirely inserted into the main segment 42, so that in this condition, as shown in FIG. 1b, the multi-part construction of the pull-out profile can scarcely be seen.

In the stowed condition of FIG. 1a, a covering face 46a, 46b of the pull-out profile almost entirely covers the exit slot 16a. This covering face 46a, 46b comprises a main section 46a which is provided on the main segment 42. It also comprises side sections 46b that are provided on the end segments 44. Together these sections 46a, 46b of the covering face conceal the exit slot 16a in an aesthetically favourable manner. When the roller blind system is in the stowed condition of FIG. 1a, its presence can therefore only be noticed on close inspection of the parcel shelf 16.

In the functioning condition of FIG. 1b it can scarcely be seen, in the manner that has already been explained, that the pull-out profile 40 is formed of multiple parts, since the end segments 44 are almost entirely inserted into the main segment 42. The covering face 46a of the main segment is bowed outwards along a longitudinal edge, so that it lies largely flush with a roof liner of the vehicle. The remaining gap 19 through which light can pass is therefore very narrow.

FIG. 2 shows a plan view of part of the pull-out profile 40. The dashed line makes it possible to see here how the end segments 44 on which the sliding elements 45 are provided are almost entirely inserted into the main segment 42 when in the functioning condition. Only a short section of the end segment 44 still protrudes from the main segment 42, having an attachment hole 44a to hold the sliding element 45, which is only shown in FIG. 2.

The construction of the pull-out profile 40 can be clearly seen in FIGS. 3, 4 and 5. Here FIG. 3 shows the whole of the pull-out profile in a condition in which the end segments 44 are almost entirely inserted into the main segment 42.

As can most particularly be seen in FIG. 5, the main segment 42 has a wall structure 41 which defines a receiving pocket 42a, into which the corresponding end segments 44 are inserted in order to reach the functioning condition of FIG. 1b, are enclosed, if the cross-section is examined, all the way around by the wall structure 41 of the main segment 42, so that the inserted section of the end segment 44 can no longer be seen, regardless of the angle from which it is observed. It can also be seen that the capacity to move the end segments 44 with respect to the main segment 42 in the transverse direction of the vehicle 2 is created by guide surfaces 44c and 42c, on the end segments 44 and in the main segment 42. The guide surfaces 44c of the end segments 44 are here provided on a profile section 44d of the end segments 44, which is located at a distance from the side section 46b. The side section 46b of the covering face does not contribute to the guidance. Instead, the side section 46b is deliberately positioned at a significant distance from an internal wall 42d of the main segment 42, so that the two do not come into physical contact. Instead of the side section 46b of the covering face, the relative vertical displacement of the end segment 44 with respect to the main segment 42 is created by a guide surface, 44e provided on a rib 41a defined by the wall structure 41. The profile sections 44d engage within a space 41b defined in the wall structure 41 vertically between the guide surface 44e and the guide surface 42c of the wall structure 41.

Scrape marks and rattling noises are avoided because the side section 46b of the covering face is at a distance from the main segment 42. The distance between the side section 46b of the covering face and the inner surface of the main segment 42 is in this case about 1 mm.

There are numerous aesthetic advantages of the roller blind system illustrated. Both in the stowed condition as illustrated in FIG. 1a and in the functioning condition illustrated in FIG. 1b, the multi-piece construction of the pull-out profile 40 leads to noteworthy aesthetic advantages. The method of construction furthermore ensures that unwanted rattles are not generated.

The invention claimed is:

1. A roller blind system for shading a rear window of a motor vehicle, comprising:
a flexible fabric sheet movable between a stowed condition and a functioning condition in a pull-out direction,
a pull-out profile provided at a distal end of the fabric sheet, and
two guide rails that are located at both sides of the fabric sheet when in the functioning condition, and which run, at least in part, non-parallel to one another,
whereby
the pull-out profile incorporates two sliding sections at respective opposite ends thereof, each of which sliding section engages with a guide rail,
the pull-out profile incorporates a covering face that is directed in the pull-out direction when in the stowed condition and which serves to cover an outlet slot for the fabric sheet, and
the pull-out profile is constructed so as to have a variable length, for which purpose the pull-out profile comprises a main segment bonded to the distal end of the fabric sheet and two end segments movable with respect to the main segment in a direction transverse to the pull-out direction, whereby the covering face comprises a main covering face section on the main segment and side covering face sections on the end segments, the main segment having a cross-section, taken transverse to a longitudinal extent of the main segment, defining a peripherally closed receiving pocket,
the end segments and their respective side covering face sections being inserted into the receiving pocket when a length of the pull-out profile is reduced, the roller blind system further including a guide arrangement disposed to maintain the side covering face sections of the respective end segments in a spaced-apart manner from said main segment, such that the side covering face sections do not contact the main segment.

2. The roller blind system according to claim 1, wherein the guide arrangement includes guide surfaces provided on the cross-section of the main segment and on the respective end segments which cooperate to guide the end segments with respect to the main segment and separate the side covering face sections from an inner surface of the main segment such that the side covering face sections do not come into physical contact with the inner surface of the main segment when inserted into the receiving pocket.

3. The roller blind system according to claim 2, wherein the guide surfaces provided on the respective end segments face towards the respective side covering face sections and restrict freedom of movement of the side covering face sections such that physical contact with the inner surface of the main segment is prevented.

4. The roller blind system according to claim 1, wherein the main segment has a form that tapers from the center towards the sides.

5. The roller blind system according to claim 1, further including a covering panel having the outlet slot through which the fabric sheet is pulled during transfer from the stowed condition into the functioning condition, the outlet slot having a length that is greater than a length of the main segment, and the pull-out profile entirely or almost entirely covers the outlet slot with the covering face thereof when the end segments are extended.

6. The roller blind system according to claim 5, wherein the roller blind system incorporates a winding shaft, preferably located underneath the covering panel, onto which the fabric sheet is wound at least to a large extent when in the stowed condition.

7. The roller blind system according to claim 1, wherein the pull-out profile and the outlet slot are matched to one another such that the pull-out profile cannot pass through the outlet slot.

8. A vehicle with a roller blind system constructed according to claim 1.

9. The roller blind system according to claim 1, wherein the guide arrangement is disposed to maintain an entire surface area of each side covering face section in a spaced-apart manner from an inner surface of the main segment in order to prevent damage to the respective side covering face sections during movement thereof relative to the main segment.

10. The roller blind system according to claim 9, wherein the cross-section of the main segment is defined by a wall structure of the main segment, the wall structure wholly encircling and surrounding each of the end segments and their respective side covering face sections.

11. The roller blind system according to claim 10, wherein each of the end segments has a guide surface and the wall structure has a guide surface located within each of the receiving pockets which slidingly engages the corresponding guide surface of the respective end segment, the guide surfaces being disposed to maintain the side covering face sections of the end segments spaced from and out of contact with the inner surface of the wall structure disposed in facing relation the respective side covering face sections.

12. The roller blind system according to claim 11, wherein each end segment includes an outwardly projecting profile section which is vertically spaced from the respective side covering face section, the guide surfaces of the end segments being defined on the respective profile sections, each profile section engaging within a space defined in the wall structure vertically between the guide surface of the wall structure and a further guide surface of the wall structure to maintain the respective side covering face sections spaced from and out of contact with the inner surface of the main segment.

13. A roller blind system for shading a rear window of a motor vehicle, said roller blind system comprising:
a flexible fabric sheet movable through an outlet slot in a pull-out direction between a stowed condition and a functioning condition, said fabric sheet being at least partially extended in the functioning condition, said fabric sheet having longitudinal edges which are spaced-apart from one another in a direction transverse to the pull-out direction;
a pair of guide rails disposed adjacent the respective longitudinal edges of said fabric sheet, said guide rails having portions which are non-parallel to one another; and
a pull-out profile disposed at a free end of said fabric sheet, said pull-out profile including a pair of sliding elements disposed at respective ends of said pull-out profile and engaged with the respective guide rails, a main segment fixed to said free end of said fabric sheet and two end segments disposed at respective opposite ends of said main segment, said pull-out profile further including an exteriorly visible covering face including a main covering face section disposed on said main segment and two side covering face sections disposed on the respective end segments, said main segment having a wall structure which defines a pair of pockets at the respective opposite ends of said main segment, each said pocket opening sidewardly outwardly in a direction transverse to the pull-out direction, said end segments being disposed within the respective pockets at the opposite ends of said main segment and being movable relative to said main segment in a direction transverse to the pull-out direction into retracted positions wherein portions of said end segments are located and enclosed within said pockets of said main segment and extended positions wherein portions of said end segments project outwardly from said main segment to provide said pull-out profile with a variable length, said wall structure at said pockets having a closed periphery so as to wholly surround each of said end segments, and said wall structure maintaining said side covering face sections spaced from and out of contact with said main segment.

14. The roller blind system according to claim 13, wherein each said end segment has a guide surface and said wall structure has respective guide surfaces located within the respective pockets which slidingly engage the respective guide surfaces of said end segments, the guide surfaces being disposed to maintain the respective side covering face sections of said end segments spaced from and out of contact with respective inner surfaces of said wall structure disposed in facing relation the respective side covering face sections.

15. The roller blind system according to claim 14, wherein each said end segment includes an outwardly projecting profile section which is vertically spaced from the respective side covering face section, said guide surfaces of said end segments being defined on the respective said profile sections, each said profile section engaging within a space defined in said wall structure vertically between the guide surface of the wall structure and a further guide surface of said wall structure to maintain the respective side covering face sections spaced from and out of contact with the respective inner surfaces of said wall structure.

16. The roller blind system according to claim 14, wherein said end segments each mount thereon a sliding element engaged with the corresponding said guide rail, said end segments projecting outwardly from the respective pockets into their respective extended positions when said fabric sheet is in the stowed condition and said end segments being disposed in the respective pockets in their respective retracted positions when said fabric sheet is in the functioning condition where a transverse distance between said guide rails is less than a transverse distance between said guide rails in the stowed condition.

17. The roller blind system according to claim 13, wherein said wall structure is disposed to maintain an entire surface area of each said side covering face section spaced from and out of contact with said main segment to avoid damage to said side covering face sections during movement of said end sections relative to said main segment.

* * * * *